United States Patent
Suffolk

(10) Patent No.: US 12,239,045 B2
(45) Date of Patent: Mar. 4, 2025

(54) AUTONOMOUS MOWER SYSTEM

(71) Applicant: Mowzr Inc., Akron, OH (US)

(72) Inventor: James Suffolk, Wadsworth, OH (US)

(73) Assignee: MOWZR, INC., Akron, OH (US)

( * ) Notice: Subject to any disclaimer, the term of this patent is extended or adjusted under 35 U.S.C. 154(b) by 203 days.

(21) Appl. No.: 18/173,851

(22) Filed: Feb. 24, 2023

(65) Prior Publication Data

US 2023/0263093 A1     Aug. 24, 2023

Related U.S. Application Data

(60) Provisional application No. 63/313,416, filed on Feb. 24, 2022.

(51) Int. Cl.
| | | |
|---|---|---|
| *H02J 7/00* | (2006.01) | |
| *A01D 34/00* | (2006.01) | |
| *A01D 34/64* | (2006.01) | |
| *H02J 50/10* | (2016.01) | |
| *A01D 101/00* | (2006.01) | |

(52) U.S. Cl.
CPC ........... *A01D 34/008* (2013.01); *A01D 34/64* (2013.01); *H02J 7/0044* (2013.01); *H02J 50/10* (2016.02); *A01D 2101/00* (2013.01)

(58) Field of Classification Search
CPC .. A01D 34/008; A01D 34/64; A01D 2101/00; H02J 50/10; H02J 7/0044
See application file for complete search history.

(56) References Cited

U.S. PATENT DOCUMENTS

| | | |
|---|---|---|
| 6,611,738 B2 | 8/2003 | Ruffner |
| 2010/0324731 A1 | 12/2010 | Letsky |
| 2021/0378171 A1 | 12/2021 | Barber et al. |
| 2021/0382476 A1 | 12/2021 | Morrison et al. |

FOREIGN PATENT DOCUMENTS

WO      2010077198 A1     7/2010

*Primary Examiner* — Mathew Franklin Gordon

(74) *Attorney, Agent, or Firm* — Renner, Kenner, Greive, Bobak, Taylor & Weber

(57) ABSTRACT

An autonomous lawnmower system includes a lawnmower capable of being operated in a non-autonomous mode and an autonomous mode. A global navigation satellite system (GNSS) is coupled with the lawnmower. A plurality of cameras and a mobile phone dock are coupled with the lawnmower as well. A drive-by-wire traction control system for controlling the lawnmower is provided as well as a navigation module, that is coupled with the lawnmower. Also, a mobile phone is included that controls and monitors the lawnmower when in the autonomous mode.

18 Claims, 11 Drawing Sheets

User Information

Name

▭ +91 ▽ Phone

Permissions

☐ Add Mowzr Devices
☐ Share Mow Paths
☐ Billing and Payments
☐ Add Mowzr Devices All users have permission to use devices and see recorded mow paths linked to this account

ADD USER

FIG. 4

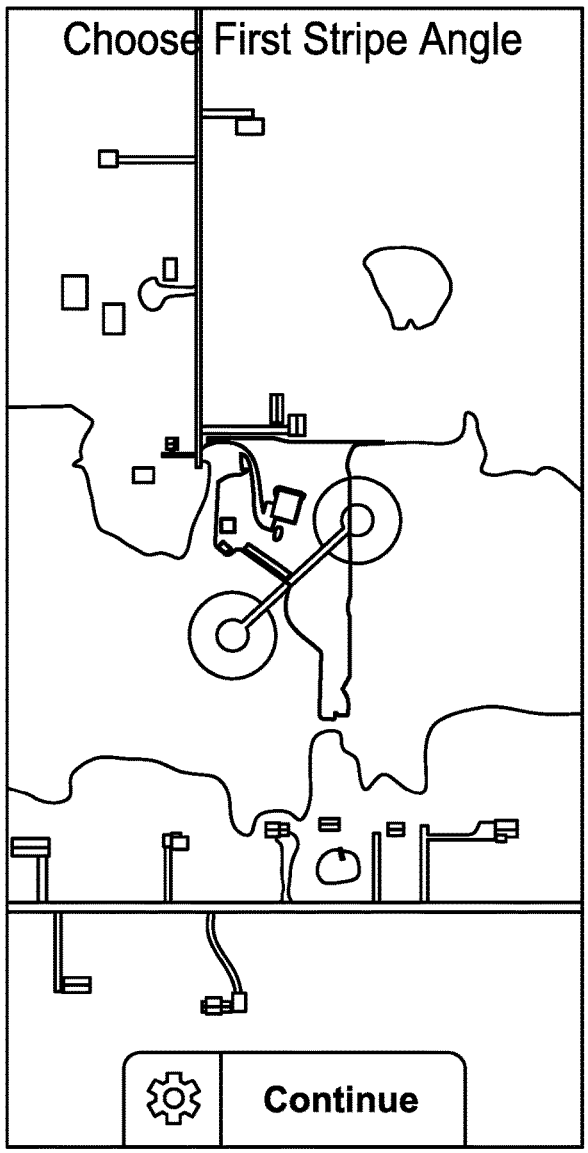 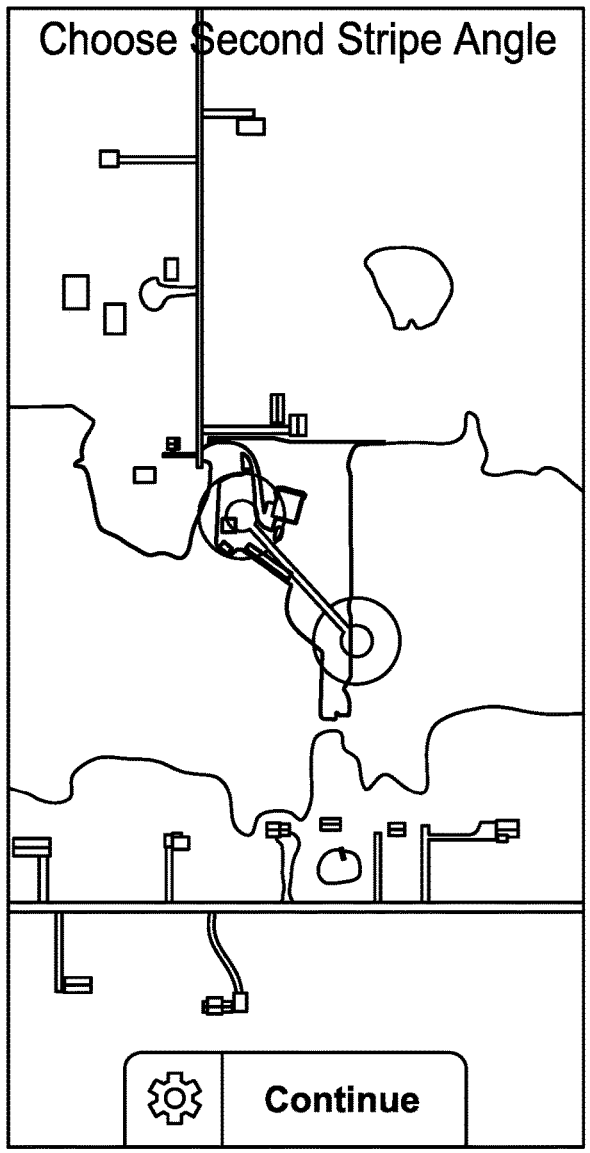
FIG. 7A  FIG. 7B

AUTONOMOUS MOWER SYSTEM

CROSS REFERENCE TO RELATED APPLICATIONS

This application claims the benefit of U.S. provisional patent application Ser. No. 63/313,416, filed Feb. 24, 2022, which is incorporated by reference herein.

FIELD OF THE INVENTION

One or more embodiments of the invention are directed toward an autonomous lawnmower system. One or more embodiments of the invention are directed toward an autonomous lawnmower system operated by a mobile phone system.

BACKGROUND OF THE INVENTION

Autonomous lawnmowers, which may also be referred to as robotic mowers or self-driving mowers, can generally mow lawns in an unmanned capacity. These mowers generally include an autonomous drive unit in order to move the mower, an onboard energy reservoir to power the drive unit, one or more sensors, and a computing unit functionally connected to the one or more sensors and the drive unit. These mowers also include one or more blades for cutting grass and a corresponding control unit for controlling the blades.

Certain autonomous lawnmowers tend to mow a lawn in a random brute-force fashion. In other approaches, the mowing area can be surrounded by an electric border wire, which emits a weak electromagnetic field. This field is used by the autonomous mower to stay within the allowed mowing area, and to find a docking or base station for recharging. For avoiding static or dynamic obstacles not indicated by the border wire, some commercially available autonomous mowers use bump and sonar sensors.

Int. Pub. No. WO 2010/077198 discloses an autonomous robotic lawnmower and a method for establishing a wireless communication link between the lawnmower and a user. A border-wire-based robotic mower communicates with a mobile terminal of the user via one or more radio-based stations of a cellular network structure. The cellular network can be used to send different types of messages between the robotic lawnmower and the mobile terminal of the user. The communication between the lawnmower and the user is generally limited to communication information messages and acknowledgement messages.

U.S. Pub. No. 2010/0324731 discloses a method for establishing a desired area of confinement for an autonomous robot. The communication between a lawnmower and a smart phone is generally limited to transmission of map information to a user. U.S. Pat. No. 6,611,738 discloses a mobile device including a module for performing robotic mowing. The communication is generally limited to the transmission of map information based on GNSS signals to the user.

Autonomous mowing of larger areas for commercial mowing applications can require different approaches. One company, Greenzie, has demonstrated one such approach, which is believed to have been first publicly demonstrated in January 2020. Their approach employs larger lawnmowers which are trained by initiating a mapping function and circling the perimeter of a region to capture a map. U.S. Pub. No. 2021/0378171 discloses a similar approach. These approaches are believed to allow for both autonomous and manual operation.

Prior approaches for monitoring the progress, location, maps, and maintenance events encountered in the course of operating autonomous equipment by a mobile phone application include those exemplified by John Deere's Operation Center mobile phone application and disclosed in U.S. Pub. No. 2021/0382476.

All such known work is believed to only provide for monitoring capability for autonomous operation. There remains a need for a unified system having recording, monitoring, and controlling (e.g., remote control) functions useful in the context of autonomous lawnmowers, which necessitates an approach that is different in terms of system design, physical components, and user interface.

Additionally, current autonomous mowing approaches are believed to lack an effective user interface for selecting and managing mow stripe angles for aesthetics, as might be utilized in commercial landscaping. Current autonomous mowing approaches are also believed to lack a comprehensive solution for dealing with unexpected obstacles. Current autonomous mowing approaches are believed to utilize 180 degree turns and mow in adjacent lines, which requires the use of multi-point turns in wet conditions to avoid damaging turf There remains a need in the art for an improved autonomous lawnmower system.

SUMMARY OF THE INVENTION

An embodiment of the present invention provides an autonomous lawnmower system including a lawnmower capable of being operated in a non-autonomous mode and an autonomous mode; a global navigation satellite system (GNSS) coupled with the lawnmower; a plurality of cameras coupled with the lawnmower; a mobile phone dock coupled with the lawnmower; a drive-by-wire traction control system for controlling the lawnmower; a navigation module coupled with the lawnmower; and a mobile phone, the mobile phone controlling and monitoring the lawnmower when in the autonomous mode.

Another embodiment of the present invention provides a kit for retrofitting a lawnmower to be autonomously operated, the kit including a navigation module mountable to the lawnmower; an electrically actuated parking brake mountable to the lawnmower and connectable to the navigation module; a switch for actuating the electrically actuated parking brake, the switch being connectable to the navigation module; a first drive-by-wire traction control system and a second drive-by-wire traction control system, the first drive-by-wire traction control system and the second drive-by-wire traction control system being connectable to the navigation module; a plurality of cameras, each camera of the plurality of cameras being connectable to the navigation module; a global navigation satellite system (GNSS) connectable to the navigation module; a mobile phone dock mountable to the lawnmower and connectable to the navigation module; and cables and connectors for integrating the navigation module into the lawnmower.

A further embodiment of the present invention provides a method of autonomously operating a lawnmower, the method including steps of mounting a safety seat or standing platform of the lawnmower; docking a mobile phone within a mobile phone dock secured to the lawnmower; accessing a mobile phone application downloaded to the mobile phone; defining a mow area by non-autonomously driving the lawnmower around a perimeter of the mow area while a global navigation satellite system (GNSS) secured to the lawnmower is capturing GNSS coordinates of the perimeter; sending the GNSS coordinates to a computer processor within the lawnmower; sending the GNSS coordinates to computer servers connected with the computer processor via the internet; saving the GNSS coordinates on the computer servers; sending the GNSS coordinates to the mobile phone; undocking the mobile phone having the GNSS coordinates from the mobile phone dock; unmounting the safety seat or standing platform; and instructing autonomous mowing of the mow area via the mobile phone application, with the proviso that an operator and the mobile phone having the GNSS coordinates are present within the mow area during the step of instructing autonomous mowing, with the proviso that the operator is not on the lawnmower during the autonomous mowing.

BRIEF DESCRIPTION OF THE DRAWINGS

Advantages of the present invention will become better understood with regard to the following description, appended claims, and accompanying drawings wherein:

FIG. 4 shows a representative image from a mobile phone application in accord with one or more embodiments of the present invention, which image shows a user having first logged in to the application;

FIG. 7A shows a further representative image from the mobile phone application, which image shows a first stripe angle being selected;

FIG. 7B shows a further representative image from the mobile phone application, which image shows a second stripe angle being selected;

DETAILED DESCRIPTION OF ILLUSTRATIVE EMBODIMENTS

Figure 1A:
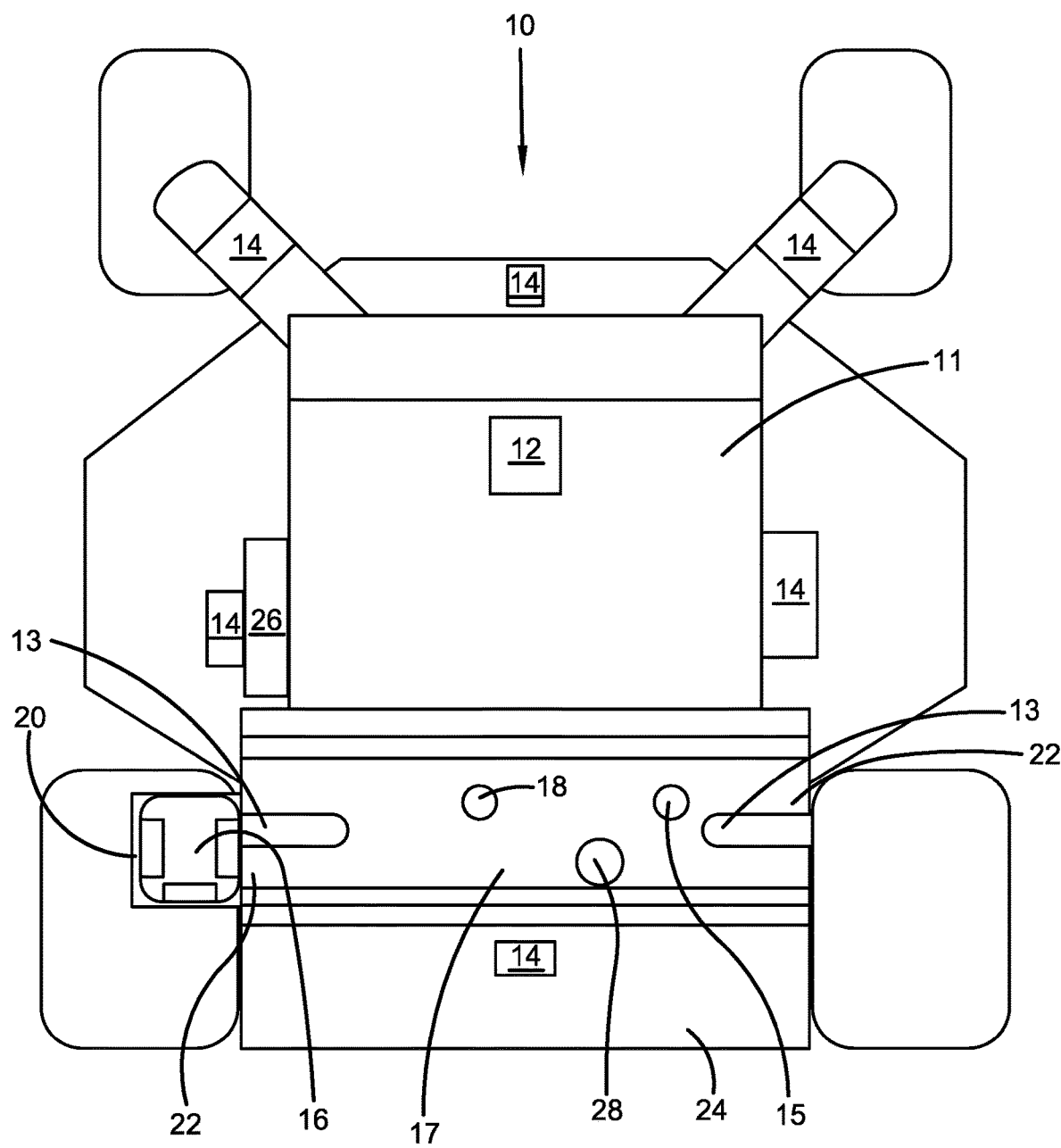
FIG. 1A is a top view of a stand-on mower utilizing a system of one or more embodiments of the present invention.

Embodiments of the invention are based, at least in part, on an autonomous mower system. The autonomous mower system includes a comprehensive, unified, mobile phone, user interface. That is, one or more embodiments of the autonomous mower system enable all aspects of autonomous mowing to be performed through a single interface. The autonomous mower system includes a variety of components and offers a variety of advantages, which are generally summarized here and further disclosed herein.

The inclusion of an integrated phone charging dock enables hands-free monitoring of other mowers, personal notifications, and media control during manual operation of a lawnmower (e.g., via hand controls). The charging dock generally maintains sufficient charge of a battery of the mobile phone, to thereby allow a screen of the phone to remain active, to thereby allow the phone to serve a role in the monitoring function. The docking and undocking of a phone may be detected within a mobile phone application by detecting a charging state of the phone as a user interface trigger.

The mobile phone application offers a unified design and generally serves as a single point of interaction. That is, the mobile phone application enables simultaneous use of recording and monitoring functions and allows seamless transition from recording to autonomous operation within the same user interface. Utilizing the mobile phone application for controlling the recording of a mow area reduces manufacturing cost and complexity of the autonomous system by eliminating the need for separate physical recording control components. The Bluetooth® capabilities in mobile phones enable users to discover and connect to nearby lawnmowers while also verifying security authentication and authorization.

The mobile phone application can include a mobile phone user interface having a rotating swipe interaction to visually select multiple stripe angles within an overhead satellite map interface. This can include relying on internet servers to synchronize behavior of striping between multiple operators or mowers, including automatic alternating of stripe angles or double-cutting with multiple stripe angles in a single mowing.

One or more embodiments of the system rely on the GNSS capabilities of mobile phones to provide a way to summon lawnmowers to the location of an operator. This can also include the lawnmower carrying the operator to particular locations, for example to deal with unforeseen obstacles such as fallen branches encountered in autonomous operation. One or more embodiments of the system include a remote-start system for providing the ability to remotely start and summon a mower after the engine has been stopped, for example to preserve fuel after autonomous mowing has completed.

The autonomous mower system moreover allows the operator to choose from a variety of solutions including autonomous circumnavigation, adding an obstacle to the mow area geometry, removal of an obstacle, pausing (i.e., in the case of living obstacles that may move themselves), and carrying the operator, which may also be referred to as chauffeuring the operator. The autonomous mower system may be utilized with newly-manufactured lawnmowers, and is also sufficiently universal as to be offered as a kit product in order to retrofit existing zero-turn and commercial lawnmowers. The autonomous mower system can also be easily integrated into existing OEM designs, simplifying manufacturing, and affording landscapers additional flexibility in their choice of equipment. The autonomous mower system can be provided as a kit that includes one or more replacing certain components of existing lawnmowers, integration with certain components of existing lawnmowers, and adding a minimal number of components. The integration with existing features of typical conventional lawnmower designs can include utilizing one or more of a power take off (PTO) blade switch, a parking brake, an ignition key, a starter, and a seat/stand safety. The autonomous mower system can include replacing drive linkages with a drive-by-wire system. The autonomous mower system can utilize the original equipment seat/stand safety of existing lawnmowers as a remote kill switch.

Figure 1B:
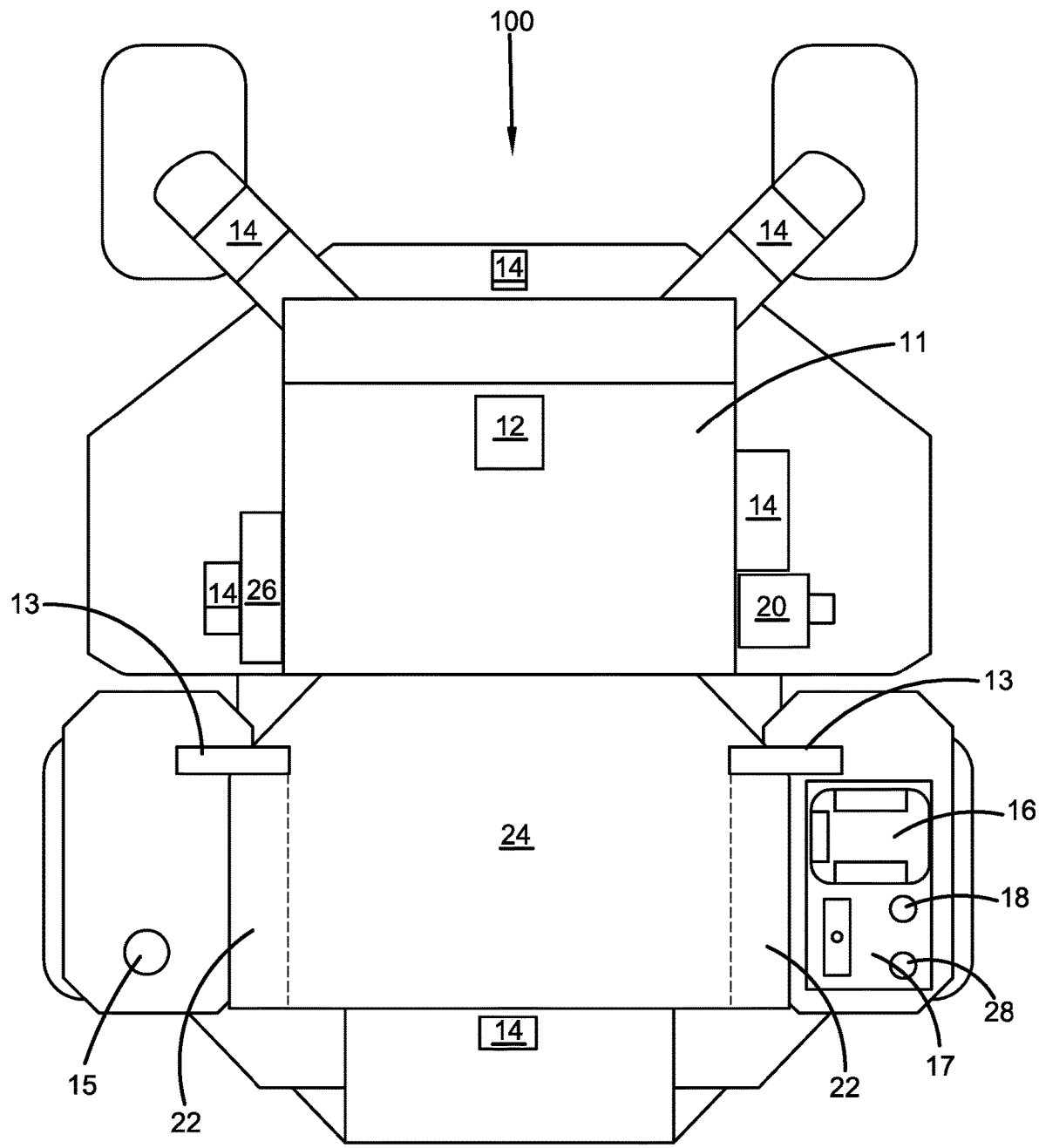
FIG. 1B is a top view of a sit-on mower utilizing a system of one or more embodiments of the present invention.

Particular reference is now made to the Figures. With particular reference to FIGS. 1A to 3, one or more embodiments of the present invention provide a system for use with a lawnmower 10, 100, which may also be referred to as mower 10, 100 or assembly 10, 100. The autonomous mower system can generally be utilized with any type of lawnmower, though particular reference is made to utilizing the system with a stand-on mower 10 as shown in FIG. 1A and a sit-on mower 100 as shown in FIG. 1B.

A navigation system, such as global navigation satellite system (GNSS) 12, is included and can be secured to a body 11 of the mower 10, 100 to capture the precise position of the mower 10, 100. In one or more embodiments, the GNSS system 12 comprises a GNSS antenna, a computer processor performing real-time kinematic (RTK) position calculations, and an internet connection. GNSS 12 offers high precision and allows for fast fix times.

The system further includes a plurality of cameras 14, where each can be secured to the body 11 of the mower 10, 100. The number of cameras 14 secured to the body 11 of the mower 10, 100 should be the number of cameras needed to achieve full vision coverage of the entire field of view of the mower 10, 100. The number of cameras 14 can be from 2 or more to 6 or less, and in other embodiments, from 4 or more to 6 or less. The cameras 14 are generally used to capture depth and to stop operations in case of sighting obstacles in the path of the mower 10, 100. In one or more embodiments, the cameras 14 are stereoscopic depth cameras.

The mower 10, 100 contains an on/off switch or ignition keyhole 15.

A phone dock 16 is also included and can be secured to the body 11 of the mower 10, 100. As shown in FIG. 1A, the phone dock 16 can be mounted to a side of the body 11. This can include being mounted directly on top of a parking brake 20. The phone dock 16 should be positioned as to ensure visibility thereof and access thereto. As shown in FIG. 1B, the phone dock 16 can be flush with the mower control panel 17. The phone dock 16 should be positioned as to avoid catching on hazards while the mower 10, 100 is in use.

An integrated phone charger may also be included in the phone dock 16. An inductive charging dock may be preferred for quicker connection and disconnection of the phone. The integrated phone charger can be powered from a power supply located within a navigation module 26, enabling a phone placed in phone dock 16 to charge from the much larger energy reservoir of a main battery of the lawnmower 10, 100. Additionally, the lawnmower battery itself may be charged by an alternator and/or regenerative braking, allowing the phone to be powered continuously for long durations. If the main lawnmower battery is low on charge, for instance if the engine is not running and providing power via the alternator, the power supply powering the phone dock 16 may be powered off to avoid excessive discharge of the main lawnmower battery.

The integrated phone charger may serve purposes beyond charging of the phone. That is, the phone may monitor for a charging state and rely on this event for triggering features of the mobile phone application. Notably, detection of the charger can enable automatic always-on display of a phone screen during manual drive operation without depletion of the mobile phone battery. It is typical for phones to employ a timeout where the screen shuts off to preserve battery life followed by a lock screen which is shown upon powering the screen back on. The system and mower 10, 100 requires both hands for operation of the hand traction controls, preventing the operator from turning the phone screen on or unlocking the phone during operation. The mobile phone application may monitor the charging status of the phone, and upon detecting the phone is charging, disable the automatic screen shutoff of the phone, so that the phone screen remains on indefinitely while the charger mitigates the concern of excessive battery discharge. Disabling the automatic screen shutoff would allow for a phone to display personal notifications such as text messages, phone calls, or information from other applications within the mobile phone to the operator while driving. Additionally, with the screen continuously on, functions of the application may be viewed during operation of the lawnmower. This function is useful in the context of several features, particularly those related to the operation of multiple simultaneous lawnmowers. Some examples include hands-free monitoring of the status of other autonomous lawnmowers in operation, notifications of lawnmower maintenance needs or events, notifications when other lawnmowers have completed an autonomous operation, and notifications when other lawnmowers have stopped operation and need intervention for reasons such as encountering unexpected obstacles such as fallen trees.

Detection of docking or undocking from the phone dock 16 may also serve as a triggering mechanism in the user interface workflow within the mobile phone application. For instance, the application may require the operator to dock a phone as a trigger for transitioning between user interface display steps when the operator is boarding the lawnmower to reduce the risk that the operator attempts to operate the lawnmower hand controls without removing the phone from their hand, potentially causing a safety hazard. Similarly, undocking may be required when deboarding to ensure the operator does not forget to remove the phone, which ensures the operator will have the ability to operate remote control functions such as a kill command or receive important safety or status notifications.

Mowers 10, 100 will also typically include a parking brake switch 18, which triggers the electrically actuated parking brake 20 (not shown in FIG. 1B) to engage or disengage. While most conventional mowers utilize a mechanically connected brake lever or switch, mowers 10, 100 utilized in the present invention should have the parking brake 20 as an electrically connected parking brake 20 to allow for the engagement or disengagement during autonomous operation. The parking brake switch 18 may use lighting or any other signaling system to display to an operator of the mower 10, 100 when the parking brake 20 is engaged. In one or more embodiments of the present invention, a lawnmower neutral switch may be used to engage the parking brake 20. In many zero-turn riding lawnmowers, one or more neutral switches are engaged upon moving the hand traction controls in an outward direction from the operator. This action may automatically engage the parking brake, eliminating the need for requiring a second operator action to engage the parking brake. The electric parking brake may take many forms, including but not limited to an electric cable brake mechanism, an electric brake caliper, or an electric gear motor that drives a mechanical clamping brake mechanism.

Typical zero-turn and stand-on mowers are driven by a mechanical control system that operates a hydrostatic drive. Mower 10, 100 utilizes a drive-by-wire traction control system 22 to allow for both autonomous and manual control of the mowers 10, 100. Mechanical control systems cannot support autonomous control. Exemplary drive-by-wire traction control systems 22 are shown in more detail in FIGS. 2A and 2B and are further described herein.

The mowers 10, 100 of the present invention contain a safety seat or platform 24. The safety seat/platform 24 is necessary to ensure the operator is safe when driving on-board and to ensure safe dismounting. A navigation module 26 is electrically connected to the safety seat/platform 24 to allow a safety to be disabled to permit autonomous mowing. The safety may be reactivated during autonomous mowing by the navigation module 26 to function as a remote kill-switch that will turn off the engine. The kill switch may be triggered by commands on the mobile phone or from vision sensing from the cameras 14. The navigation module 26 contains processors and circuit boards and operates based on an algorithm to perform navigation calculations, to synchronize mow paths, and to control and coordinate all the components utilized in the system of embodiments of the present invention. Some of the processors contained within the navigation module 26 can include an Inertial Measurement Unit (IMU) processor, a Bluetooth® modem, a real-time kinematic GNSS receiver, a cellular modem, a fast-booting processor such as a STM32 processor capable of timing-sensitive functions such as managing drive-by-wire functions, and a powerful processor such as a Jetson Nano processor capable of machine learning functions such as machine vision processing. These functions may be served by any number of processors in various embodiments of the present invention.

Mowers 10, 100 also include a power take off (PTO) blade switch with override functionality 28. The PTO blade switch 28 is controllable by a human operator or may be overridden by the navigation module 26 to allow the blades of the mower 10, 100 to be enabled after the operator has safely dismounted for autonomous mowing. The PTO blade switch 28 is electrically connected to the navigation module 26 and the blade controls of the mower 10, 100.

Figure 2A:
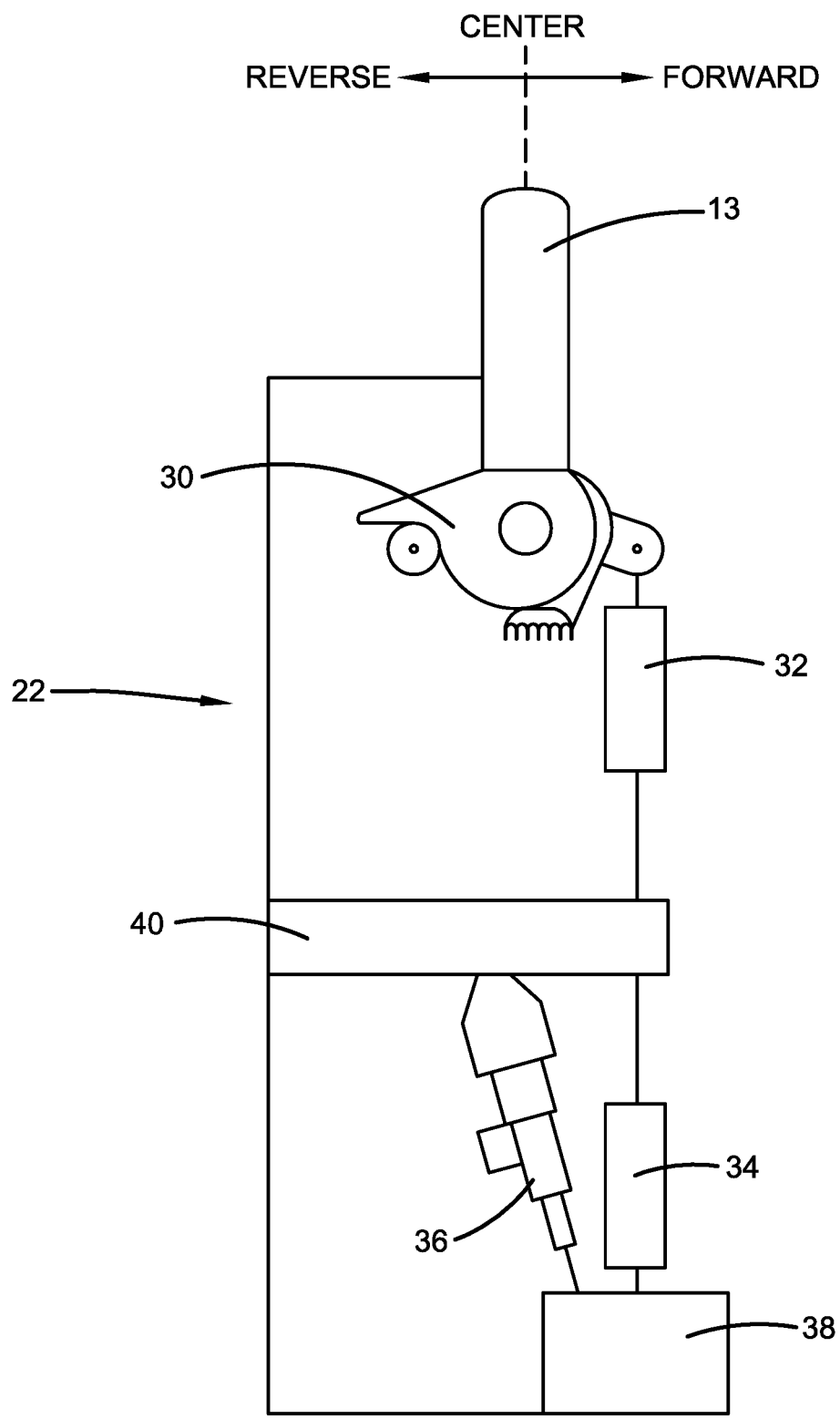
FIG. 2A is a side view of a drive-by-wire traction control system, which can be utilized with the mower of FIG. 1A.
Figure 2B:
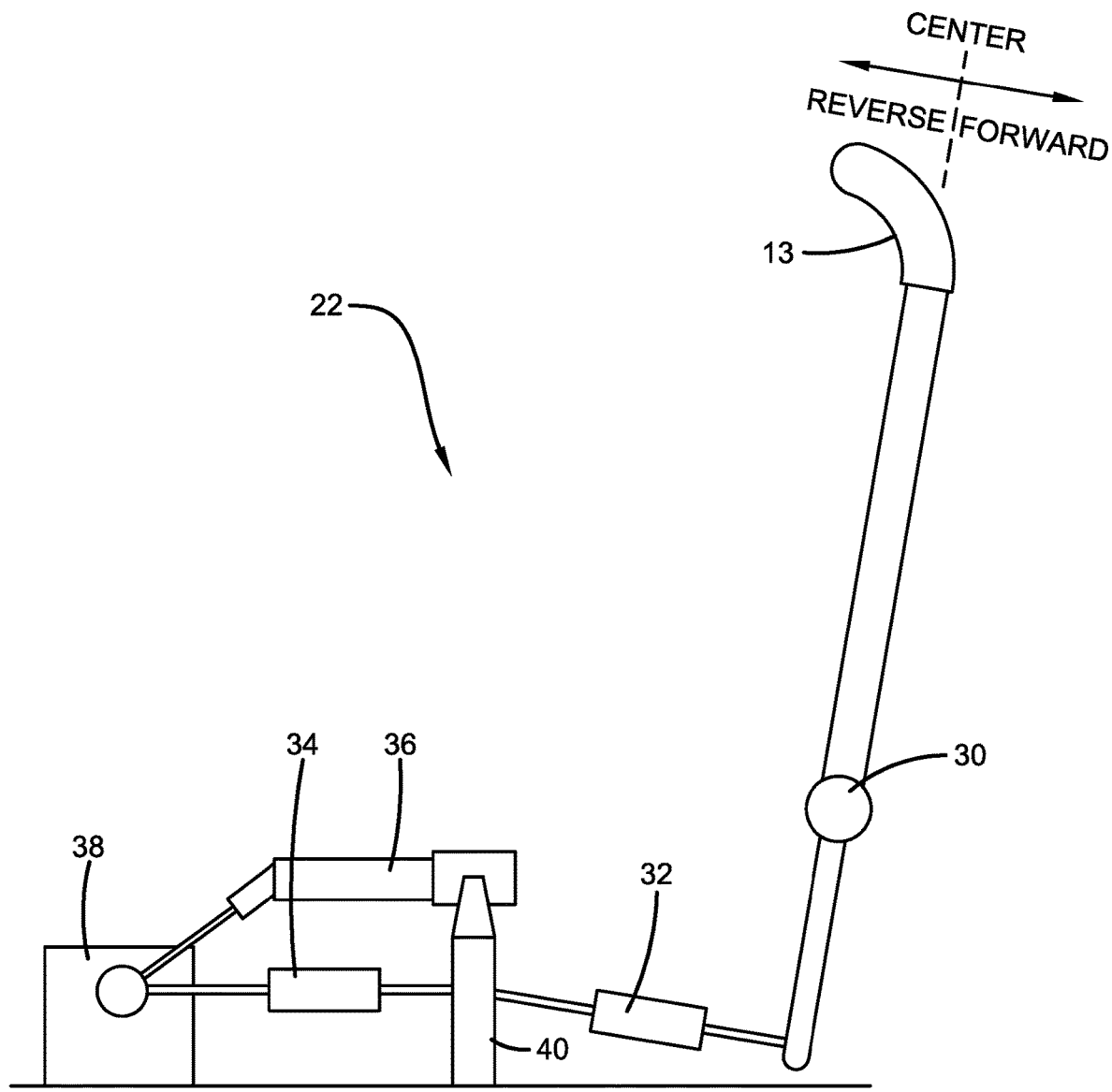
FIG. 2B is a side view of a drive-by-wire traction control system, which can be utilized with the mower of FIG. 1B.

The drive-by-wire traction control system 22 is shown in FIGS. 2A and 2B. FIG. 2A shows a drive-by-wire traction control system 22 suitable for use with the mower of FIG. 1A and FIG. 2B shows a drive-by-wire traction control system 22 suitable for use with the mower of FIG. 1B. Drive-by-wire traction control system 22 includes a throttle return spring mechanism 30, a hand traction control potentiometer 32, an actuator potentiometer 34, a linear actuator 36, a hydrostatic drive 38, and a shared mounting bracket 40. Although FIGS. 2A and 2B only show the components of a singular drive-by-wire traction control system 22, there should be a drive-by-wire traction control system 22 on both the right and left sides of the mower 10, 100.

The throttle return spring 30 is connected to the hand-operated traction control arm 13 to return the traction control to center and to provide resistance to operator control. The throttle return spring 30 is mechanically connected to both the moving traction control arm and to a stationary point on the mower 10, 100. The hand traction control potentiometer 32 is mechanically connected to both the hand-operated traction control arm and a stationary point on the mower 10, 100 to measure the hand throttle position. It is also contemplated that other position measurement sensors such as an actuator-integrated potentiometer or a hall-sensor may be used to measure the hand throttle position. The actuator potentiometer 34 measures the current position of the linear actuator 36 which is used to actuate the hydrostatic drive 38 in forward and reverse. It is also contemplated that other measurement sensors such as an actuator-integrated potentiometer or a hall-sensor may be used to measure the position of the linear actuator 36. The hydrostatic drive 38 is used to independently drive the wheels. As shown in FIGS. 1A and 1B, the drive-by-wire traction control system 22 are utilized on both sides of the mower 10, 100 for independent left- and right-hand controls. In other embodiments, if the mower 10, 100 is an electric mower, then actuator potentiometer 34, the linear actuator 36, and the hydrostatic drive 38 may be replaced by an electric motor with a rotation speed feedback sensor. As shown in the Figures, the shared mounting bracket 40 has various elements, such as the actuator potentiometer 34 and the linear actuator 36, secured thereto.

Figure 3:
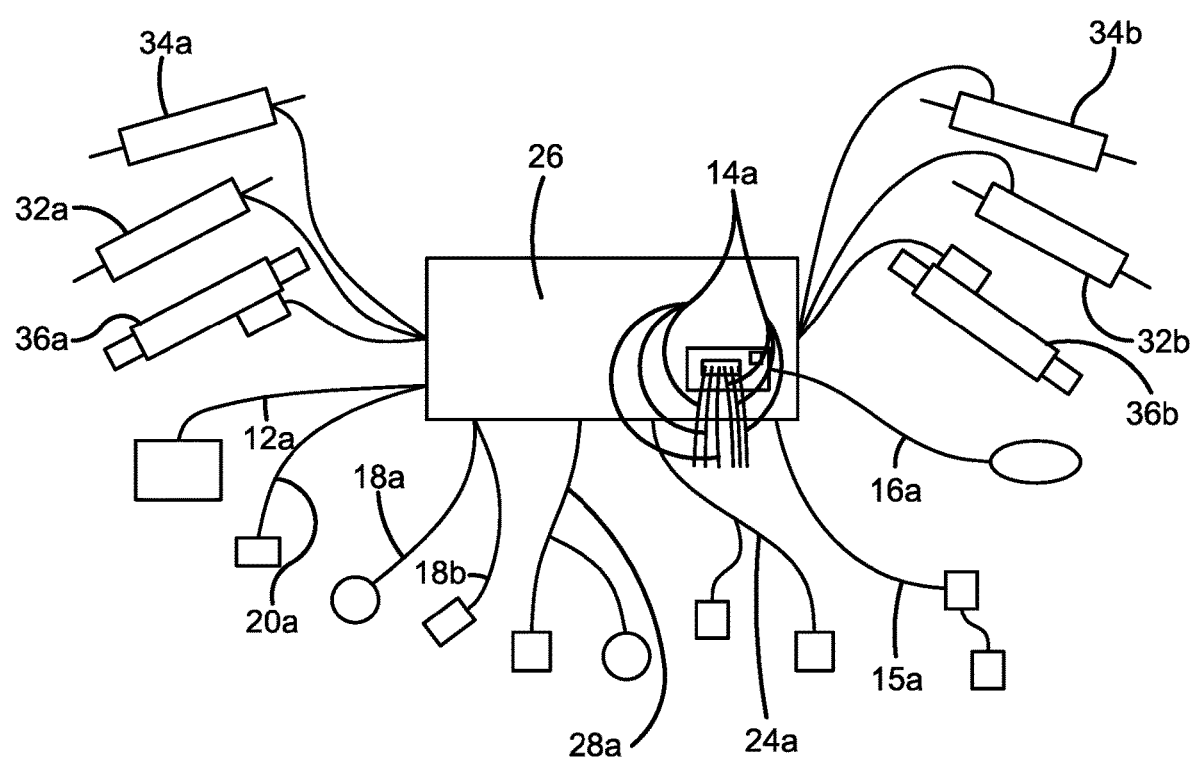
FIG. 3 shows a wiring diagram for utilizing a navigation module within a system of one or more embodiments of the present invention.

FIG. 3 shows the wiring, such as cables and connectors, emanating from the navigation module 26, showing how the navigation module 26 controls most features of a mower within a system of the present invention. Wiring 12a connects the GNSS system 12 to the navigation module 26; wires 36a and 36b connect the right and left linear actuators 36 to the navigation module 26; wires 34a and 34b connect the right and left actuator potentiometers 34 to the navigation module 26; wires 32a and 32b connect the right and left hand traction control potentiometers 32 to the navigation module 26; wiring 15a connects the on/off switch or ignition keyhole 15 to the navigation module 26; wiring 24a connects the safety seat or platform 24 to the navigation module 26; wiring 28a connects the PTO blade switch 28 to the navigation module 26; wiring 18a connects to the parking brake activation signal and 18b connects to the parking brake indicator light to the navigation module 26; wiring 20a connects the parking brake 20 to the navigation module 26; the plurality of wires 14a connects each of the plurality of cameras 14 to the navigation module 26; and the wiring 16a connects the phone dock 16 to the navigation module 26.

The wiring 15a connecting the on/off switch or ignition keyhole 15 to the navigation module 26 draws power from the battery (not shown) or alternator (not shown) when the switch 15 is on and this connection can also allow for remote start capability. The remote start function could be activated by receiving a remote start command over a wireless connection, typically a cellular internet connection. This would trigger the navigation module 26 to activate the starter circuit of the lawnmower through an electrical connection, for example by triggering an electrical relay switch. Once the starter has been activated, a method may be employed to detect when the engine has started. In one embodiment of the invention, a processor within the navigation module 26 would analyze measurements from an accelerometer captured from the IMU sensor to detect when the engine has started. This may be achieved by monitoring the frequency and amplitude of the vibrations of the accelerometer and detecting the engine has started when the accelerometer noise amplitude exceeds the level of a started engine for a minimum duration. Once it is detected that the engine has successfully started, the starter circuit is deactivated, and a signal is sent over a wireless connection to notify operators that the mower has successfully started. If the starter circuit is unable to start the engine after a certain amount of time, a different signal could be sent over the wireless connection to notify the operator that the remote start command failed.

It should be appreciated that a human operator may operate the mower 10, 100 as a normal non-autonomous mower. Turning the on/off switch or ignition keyhole 15 on powers on the navigation module 26. All normal mower 10, 100 operations are quickly enabled by the processors located within the navigation module 26 that support drive-by-wire features. The processors within the navigation module 26 capture hand throttle inputs from the hand traction control potentiometers 32 and operates the drive-by-wire traction control systems 22. The position of the hand traction control potentiometers 32 is compared with the actuator potentiometers 34 on both left and right sides. This comparison is used to actuate the linear actuators 36 to mimic the movement of the hand-operated traction control arms to achieve drive-by-wire control as is known in the art. The electronic parking brake switch 18 is also connected to processors located within the navigation module 26 which operate the electronic parking brake mechanism. A light may be used to signal that the brake 20 is engaged. The PTO switch 28 is also connected to the same processor, functioning in normal operation unless overridden.

The navigation module 26 may have Bluetooth® or other short-range wireless connectivity for discovery by a nearby mobile phone. Cryptographic protocols register the hardware to an account on computer servers, which details thereof will be generally known to the skilled person. The account may have multiple users and will synchronize recorded mow areas automatically between all operators and lawnmowers. The phone can be mounted in the dock 16 attached to the mower 10, 100 to charge and securely hold the phone while the operator manually drives or records a mow area as will be described in more detail below. The phone dock 16 has an integrated wireless charger powered from the navigation module 26.

As suggested above, the autonomous mower system works in conjunction with a mobile phone application that is downloadable to any mobile phone, along with a cloud-based synchronization of all mow areas recorded. The mobile phone application can be used for recording mow areas, to be discussed in detail below, while also being used for autonomous monitoring and control of the mower. Operators of the autonomous mower system of the present invention will install and register an account on the mobile phone application, and authorized administrators of the accounts can add additional users to enable cloud-based synchronization of mow area recording with other users linked to the account.

Once a user is logged in to the mobile phone application, they will be presented with a screen similar to the image shown in FIG. 4. This screen can show mowers currently in operation. This screen can show the current location of each mower and the progress of the mower when in the middle of mowing. A button or swipe can switch between showing different mowers currently in operation. The operator may choose to select a mower currently in autonomous operation, transitioning to show autonomous drive monitoring screens. Alternatively, a button in the mower selection process can initiate a search for nearby mowers. If no mowers are operating, the mower selection screens are not displayed, and the mower search process can begin automatically. Upon initiating a mower search, nearby mowers connected to the mobile phone application are detected by scanning over Bluetooth® or another short-range wireless protocol from the mobile phone. When a nearby mower is detected, a connection is initiated.

When a user connects to a nearby mower, a cryptographic handshake confirms the user is an authorized user for the mower. This operation may also check subscription payment status and require payment if needed to enable autonomous operation. After a successful handshake, the mobile phone application displays a screen for recording mow areas and autonomous operation. This screen features a satellite map along with controls for recording or autonomous operation. Within this screen the operator may either record a mow area or select an existing mow area.

Figure 5:
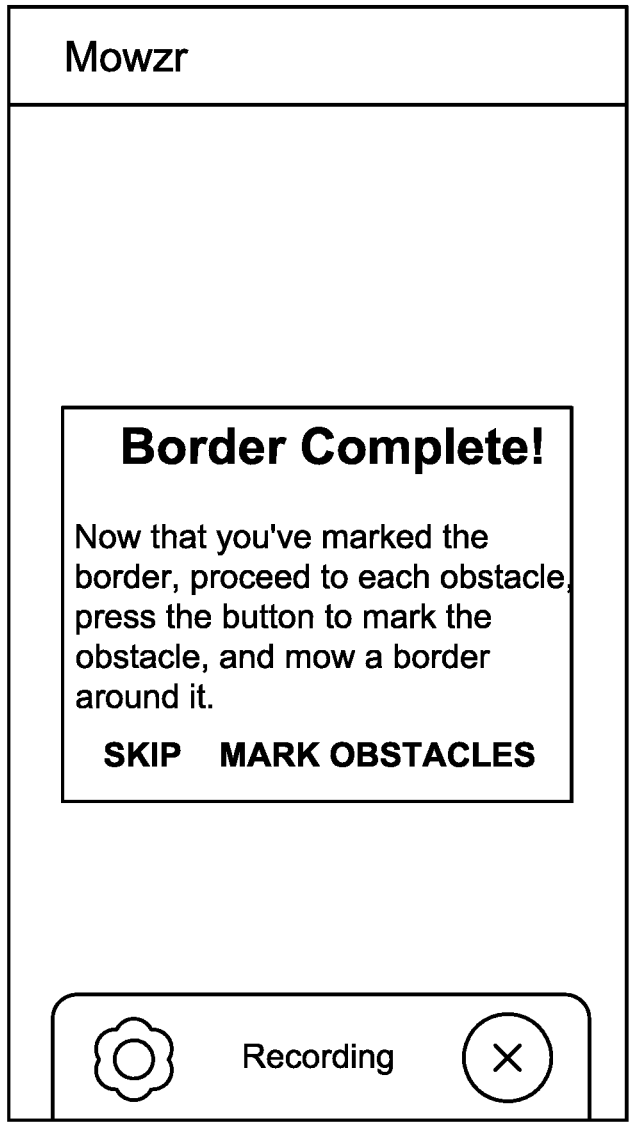
FIG. 5 shows a further representative image from the mobile phone application, which image includes a notification to the user that the manual tracing of a border of a mow path has been completed.

To record a new mow area, the user will first tap a button within the mobile phone application to begin recording. The user first drives the perimeter of the mow area from the mower with the hand traction controls. The navigation module 26 captures and record precise GNSS coordinates captured by the GNSS system 12 while driving and progress is displayed on the mobile phone application. When the navigation module 26 senses the user has completed the perimeter loop by detecting that the operator has completed a loop and returned to the GNSS coordinate this is sufficiently close to the starting location, recording is stopped and the user is notified that the perimeter is complete, such as shown in the image of FIG. 5.

Figure 6:
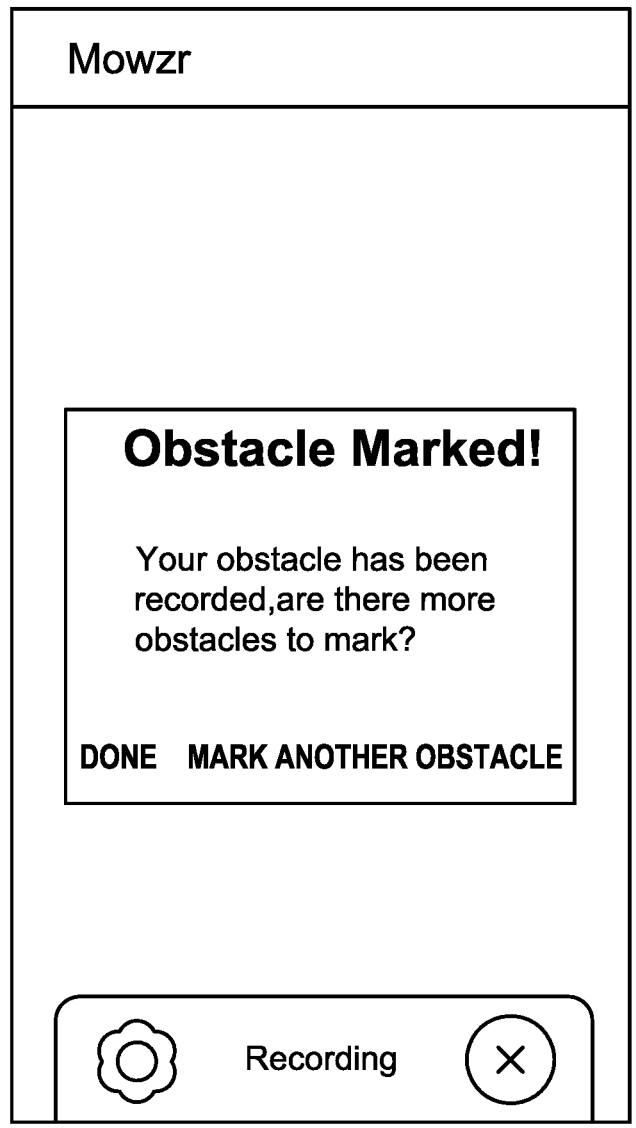
FIG. 6 shows a further representative image from the mobile phone application, which image includes a notification to the user that the manual tracing of a border of an obstacle within the mow path has been completed.

The user may then capture recordings of any obstacles within the captured perimeter loop, such as sheds, trees, or other obstacles. For each obstacle, the user taps the record button within the mobile phone application and drives around the perimeter of the obstacle with the hand traction controls to capture the perimeter of the obstacle(s) as GNSS coordinates. When the navigation module 26 senses the user has traversed the perimeter of the obstacle by detecting the operator has completed a loop and returned to a GNSS position that is sufficiently close to the starting location to constitute a complete loop, recording is stopped and the user is notified that the perimeter of the obstacle is complete, such as shown in the image of FIG. 6

After each recorded perimeter or obstacle loop, the user is prompted within the mobile phone application to answer if recording is complete. Upon signaling completion of recording, the user is prompted by the mobile phone application to select two stripe angles for the mow area. The stripe angle may be chosen by rotating a finger around the screen of the mobile phone with a tap and drag interaction. After selecting the first stripe angle, as shown in FIG. 7A, and tapping continue, a second stripe angle 90 degrees offset from the first is the default for the second stripe angle, as shown in FIG. 7B. The prior stripe angle is shown for reference. The user may again rotate their finger around the screen with a tap and drag to change the stripe angle. Once the stripe angles have been chosen and the continue button has been tapped, the user is prompted within the mobile phone application to provide a name for the recording. The recording is then saved to the mobile phone including the perimeter, obstacles, and stripe angles for future use. The mobile phone's cloud-based synchronization shares this recording with other authorized users on this account, the details of which will be generally known to the skilled person. After saving the recording, the user is provided the option to complete mowing of the property in autonomous drive operation as described below.

Prior to the recording of any mow areas through the use of the mobile phone application, the drive-by-wire traction control systems 22 will need to be calibrated. Specifically, the calibration of true north needs to be done by capturing the precise angle offset between the orientation captured from the IMU processor within the navigation module 26 and true north. Calibration of the position offset of the GNSS system 12 needs to be done by capturing the precise position offset between the GNSS antenna and the center of the mower 10, 100. Calibration of the minimum position, maximum position, and center position of the throttle hand-traction control 35 as observed by the hand-traction-control potentiometer 32 will also need to be undertaken. Additionally, calibration of the minimum position, maximum position, and center position of the actuator potentiometer 34 is required. In one embodiment of this invention, calibration of the drive-by-wire traction control systems 22 is orchestrated through a mobile phone application.

In the place of an IMU processor and position sensor, a dead-reckoning system may be utilized in other embodiments. A dead reckoning system can still allow for accurate position tracking even when GPS or internet signal is lost or spotty for a period of time. A dead reckoning system can utilize wheel speed sensors on each wheel. Though it may be desirable to instead estimate wheel speed. Calculating an estimated wheel speed may be done based on a potentiometer of the system, e.g., actuator potentiometer 34 which measures the hydraulic actuator.

Figure 8:
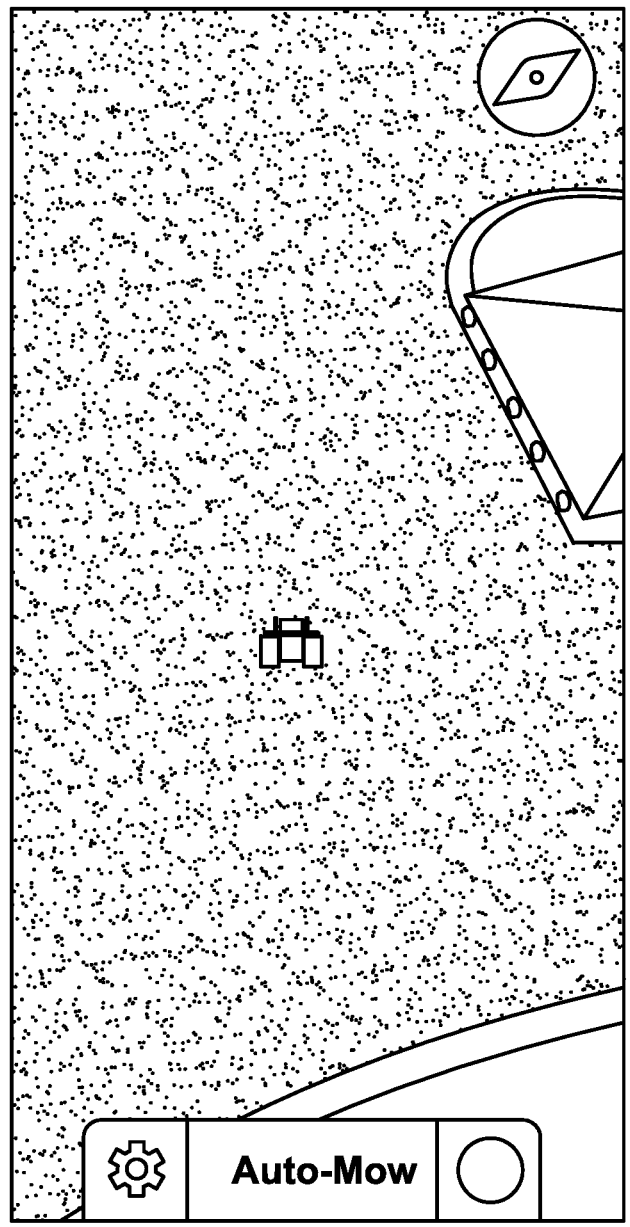
FIG. 8 shows a further representative image from the mobile phone application, which image shows a user situated within a boundary of a previously recorded mow area.

To utilize a mower, such as mower 10 or 100 to autonomously mow an area, the user must be situated within the bounds of a previously recorded mow area, as shown in FIG. 8 wherein the previously recorded mow area is indicated on the mobile phone screen as the shaded area. If the user is present within the bounds, they will be presented with the option on the mobile phone application to begin autonomous mowing. An edit option is also presented within the drive menu on the mobile phone within the application. The edit option initiates a screen that allows the user to remove obstacles, initiate marking of new obstacles (using the obstacle marking process described above), or to cordon off parts of the mow area. Sections may be cordoned off by slicing a line through an overhead view of the mow area with a finger swipe interaction. Upon completion of editing, the original mow area may be overwritten or saved as a new alternate mow area.

When the auto-mow option is selected, the brake is engaged, and the blades are shut off through the navigation module's electrical connection. If there are alternate mow areas available, the user is presented with a screen to choose a mow area. A swipe or button interaction switches between alternate mow areas, showing the preview and name of each mow area in an overhead view. If there is only one mow area, the mow area selection step is skipped. Once a mow area has been chosen, the user is prompted within the mobile phone application to choose a stripe option: single-cut or double-cut. A single-cut will generate a mow path that creates stripe fill lines with the angle of the least-recently-mowed saved stripe angle. A double-cut will generate a mow path that mows both stripe angles. The system then calculates a mow path from the recorded mow area selected stripe angle. A mow path is a collection of waypoints, line segments, or other geometric data to support autonomous drive operation.

During the creation of the mow path, the navigation module 26 captures GNSS coordinates from the GNSS system 12. The GNSS coordinates are first transformed from the coordinate system in which they were captured to flat east-north-up (ENU) Euclidean coordinates to allow for the creation of 2-dimensional geometry operations, the details of which will be generally known to the skilled person. In the ENU coordinate system the sensor point readings are treated as 2D coordinates in the east-north plane. A concave hull can be calculated from the collection of points that was captured in recording the border of the mow region, as is known in the art. The points composing the concave hull are then projected inward to calculate an inner concave hull with the goal of defining an inner border that is always a fixed distance from the outer border. It is typically necessary to remove or modify some points in the inner hull in corner situations to ensure the inner hull is always a fixed distance from the outer hull. This inward projection to create an inner hull may be repeated to allow for any number of parallel equidistant concave hulls. The outer hull forms the outermost border the mower 10, 100 will follow to ensure a clear edge line while the inner hulls form a wider border zone where the mower 10, 100 may make turns without leaving the mow area or missing mow coverage.

Figure 9:
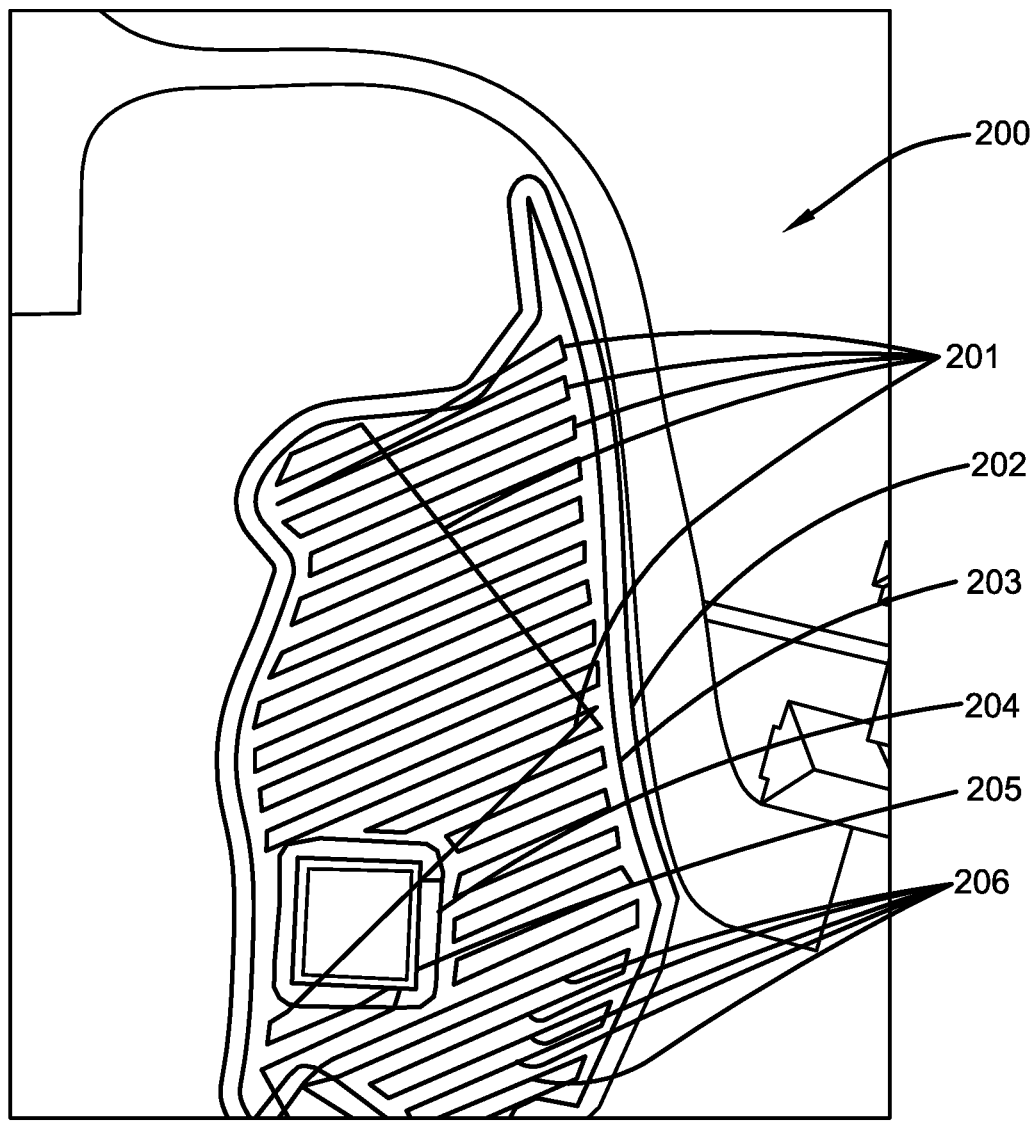
FIG. 9 shows a further representative image from the mobile phone application, which image shows a mow path.

Concave hulls may also be generated from any obstacle points. Outer obstacle hulls are generated with an outward projection with the goal of defining a hull that is a fixed distance from the inner obstacle hull. This may be repeated to allow for any number of parallel equidistant concave hulls. For an obstacle, the inner hull forms the innermost border that the mower 10, 100 will follow to ensure a clear edge line, while the outer hulls form a wider border zone where the mower 10, 100 may make turns without entering the obstacle area or missing mow coverage. Next, a system of fill lines can be generated by intersecting equidistant lines with all borders and spacing them with an offset a minimum distance away from all borders. A sample mow path 200 as described above is shown in FIG. 9, with jump segments 201, a border outer concave hall 202, a border inner concave hall 203, an obstacle outer concave hull 204, an obstacle inner concave hull 205, and fill lines 206.

A plan can then be devised to navigate from the current position and traverse all geometric artifacts including outer and inner border concave hulls, outer and inner obstacle concave hulls, and all fill lines. Each geometric artifact is traversed completely, followed by a point-to-point jump segment to the start point of another artifact. Fill lines may be started on either end, while concave hulls may be started at any point along the loop. The order in which geometrics artifact are traversed is calculated by a path search algorithm designed to minimize the total length of all jumps, as is known in the art. The autonomous driving algorithm travels through jump segments differently than geometric artifacts. When following the lines of geometric artifacts the algorithm follows the path precisely, solving for minimum deviation from the path line. However, when traversing jump segments, the algorithm may take indirect paths by going around obstacles. This can be done with ray casting and other algorithms that look ahead to find an unimpeded path from the mower's current location to the target of the jump.

Up to this point in the process, a short-range wireless connection such as Bluetooth® can be utilized between the mower 10, 100 and the mobile phone. In order to safely operate autonomous mowing, the short-range wireless connection is disconnected, and the connectivity is replaced by cellular communication through an internet server. This allows for communication over any distance while the mower 10, 100 is in autonomous operation. The navigation module 26 communicates to one or more computer servers over the internet and the mobile phone communicates to the same servers or connected servers, the details of which will be generally known to the skilled person. The internet servers facilitate a secure long-range channel where the phone and the mower 10, 100 may communicate over cellular protocols through the server intermediary. The server intermediary maintains the state of communication and mower activities while passing messages from phone to mower 10, 100 or vice versa. Various protocols may be used for this communication, including web (HTTP/HTTPS) requests, web sockets, web polling, web long polling, or mobile push notifications. A setting in the mobile phone application user interface may allow the user to enable or disable receipt of some or all push notifications to control whether the user would like to receive notifications from the application when the application is not active in the foreground on their phone.

After the cellular internet connection has been established, the user can be instructed to remove their phone from the phone dock 16 and to dismount the mower 10, 100. The user may not be allowed to continue until the phone has been undocked from the phone dock 16 and the user has dismounted as a safety precaution. This behavior can be enforced by detecting that the phone is no longer being charged by the phone dock 16 and that the safety seat/platform 24 is not engaged. This state is communicated over the cellular internet connection and the phone may automatically proceed once it has been completed.

After the phone has been undocked from the phone dock 16 and the user dismounts, the user can be presented with a start screen through the mobile phone application that initiates the autonomous mowing process. To avoid accidental engaging of autonomous mowing, a user interface action should be used that may not be triggered accidentally. In one embodiment, a start button through the mobile phone application must be held for 5 seconds with a countdown and haptic feedback. If a single-cut stripe mow angle was selected as previously described, the least-recently-mowed stripe angle may be alternated and then saved upon completion of this user interface action. Additionally, the state of the mow area should be updated to denote that the mow area is currently being mowed. Both the updated stripe angle and the updated state of the mow area can be synced to the cloud internet servers. The mower 10, 100 can then begin autonomous driving as described below.

When entering a mow area and before beginning mowing an area, the navigation module 26 of the mower 10, 100 verifies through internet servers whether other lawnmowers are operating in the mow area. If other mowers are operating within the mow area, the mow area selection and stripe selection steps are skipped. After the operator deboards and completes the user interface action to begin autonomous mowing, the mobile phone application controlling the now autonomous lawnmower sends a command through the cellular connection to request joining the mowing of the mow area. All mowers currently in operation within the mow area pause their operation and acknowledge receipt of this command and send the current state of progress and/or a list of untraversed geometric artifacts such as fill lines to a central server or a single mower. An algorithm can be employed to subdivide the geometric artifacts that have not yet been mowed, excluding jump paths, among all mowers operating in the mow area including the new mower that is joining. This algorithm seeks to equalize the distance of travel needed to traverse geometric artifacts assigned to each mower, to assign geometric artifacts in a manner such that adjacent artifacts are assigned to the same mower, and to minimize the total distance travelled for all mowers. The internet servers send the subdivided geometric artifact assignments to each participating mower. Jump lines are recalculated for each mower to traverse the new artifacts assigned to each mower in the most efficient manner. Upon receiving the new mow path assignment, each mower may automatically resume operation on their new assignment.

The mow path, as selected above, can then be stored within the navigation module 26 during autonomous driving. During autonomous mowing, the mower 10, 100 will read output from the GNSS system 12 for position and velocity, the IMU processor contained within the navigation module 26 for orientation and acceleration, and actuator position from the actuator potentiometers 34. Theses output readings are mathematically transformed and fed into a trained machine learning algorithm, the details of which will be generally known to the skilled person. The machine learning algorithm can be evaluated at high-frequency and continuously updates the position of the linear actuators 36 as needed to follow the mow path. During autonomous drive, the hand traction control potentiometer 32 signals are ignored, and the drive of the linear actuators 36 are electronically actuated from the output of the machine learning algorithm.

During autonomous operation, the mower 10, 100 will pause operation and notify the operator if any unmarked obstacle is encountered by the cameras 14, as described in more detail below. The position, orientation, and velocity of the mower 10, 100 will be transmitted over the cellular connection between the navigation module 26 and the internet servers. Any mobile phones monitoring the mower 10, 100 can then request this information from the cloud and display the position, orientation, and progress of the mower 10, 100 as it follows the mow path. The displayed location estimates position since the last network packet and interpolates the position when new packets are received for smoother animation, the details of which will be generally known to the skilled person.

Users who are operating the autonomous mowing as done by mower 10, 100 may issue a 'kill' command through the mobile phone application. Issuing the kill command results in a signal being sent to the navigation module 26 over the cellular connection, and upon receiving this signal, the navigation module 26 immediately stops the engine of mower 10, 100, engages the parking brake 20, returns the linear actuators 36 to a neutral throttle position, and stops all autonomous drive calculations and processes.

The engine can be stopped by a signal issued by an electrical connection between the navigation module 26 and the engine. This can be achieved by electrically re-enabling the safety seat/platform 24 with the blades still engaged. When the safety seat/platform 24 is re-enabled, it triggers a safety feature designed to kill the engine when blades are engaged with no operator seated, and the mower 10, 100 will automatically power down. This leverages the typical OEM seat/stand safety switches in zero-turn mowers which power off the mower engine if blades are engaged without an operator's weight activating a seat or standing platform. A status screen may then be displayed to the on the mobile phone application, notifying the user that the mower operation has stopped.

When the mower 10, 100 is in a killed state, the navigation module 26 is still powered on and can accept signals from the internet. The mobile phone application will display the location and orientation to the user through the mobile phone. The user may reboard and manually drive the mower 10, 100, remotely tap a button in the mobile phone application to resume mowing or tap a button in the mobile phone application to issue a summon command as described below. Tapping the button to resume mowing from a kill state issues a command to the navigation module 26 over the cellular connection. This command remotely triggers the ignition switch to start the engine of mower 10, 100 and resumes autonomous mowing from the location where it was killed.

The summon command is available when the user is located within the mow area. Summoning the mower 10, 100 by tapping a button in the mobile phone application sends a command through cellular connection to the navigation module 26, which will trigger ignition of the engine of mower 10, 100 by means of the previously described remote start command, and the mower 10, 100 will follow a path from its current location to the location of the user. The user's location is captured from the GNSS receiver within the user's mobile phone issuing the summon command and sent along with the summon command to the mower 10, 100 through the cellular connection. The summon feature uses the same machine learning algorithms to return the mower 10, 100 to the user using the GNSS system 12 for position and velocity, IMU for orientation and acceleration, and actuator position from the actuator potentiometers 34. This is achieved using a 'jump path' algorithm further described below. The jump path stretches from the current location of mower 10, 100 to the location of the user.

The user must be within the recorded mow area to summon the mower 10, 100. As with other jump paths, ray casting and look ahead algorithms can be employed to mathematically navigate around marked obstacles, the details of which will be generally known to the skilled person. The mower 10, 100 can use the cameras 14 to ensure it does not go too near to the user before stopping the summon operation. The summon operation can be stopped and the user can be notified through the mobile phone application as soon as the mower 10, 100 encounters any unmarked obstacle or the user.

In addition to issuing a kill command or a summon command, the user can also issue a pause command. Tapping the pause button though the mobile phone application results in the phone sending a pause signal to the navigation module 26 over the cellular connection. Upon receiving this signal, the navigation module 26 immediately returns the linear actuators 36 to a neutral throttle position, engages the brake 20, and stops all autonomous drive calculations and processes. The engine is not stopped when a pause command is issued. A pause overlay is displayed to the user on the mobile phone application, notifying them that the operation of mower 10, 100 has paused. The user may then summon the mower 10, 100 as described above or resume operation by tapping the un-pause option within the mobile phone application.

As discussed above, the cameras 14 provide a vision safety system to ensure the operation of autonomous mowing is done in a safe manner. The cameras 14 can be trained with a machine learning algorithm, the details of which will be generally known to the skilled person, to halt operation of the mower 10, 100 upon encountering any unmarked obstacles in its path. The machine learning algorithm processes the depth image frames from the cameras 14 along with information describing the upcoming mow path segments to stop operation if any unknown objects are encountered in the path. Upon detecting any obstacles in its path, other than a limited number of known drivable surfaces (e.g., grass, pavement, gravel, mulch), the mower 10, 100 pauses autonomous mowing, engages the brake, disengages the blades, saves the current state of autonomous mowing in terms of the current position along the current segment of travel in the mow path, and notifies the operator via a mobile push notification or other signal through the cellular connection.

An object classification algorithm can be employed to determine what kind of obstacle is encountered. At a minimum, the classification algorithm should distinguish between living entities such as people, pets, or animals where there is a safety concern, and non-living entities such as fallen trees, buildings, toys, vehicles, or structures. A classification label, image, or video of the obstacle captured from the cameras 14 may optionally be transmitted and displayed on the operators phone to help with situational assessment.

If the obstacle is classified as a living entity, such as a person or pet, within an unsafe distance that creates a safety concern, the lawnmower 10, 100 will automatically pause autonomous operation until the entity moves beyond a minimum safe distance for a minimum time period. The lawnmower 10, 100 may then automatically resume autonomous operation. A timer may be employed to notify the operator for manual intervention if the living obstacle remains for a relatively longer period.

In the unlikely event the classification algorithm detects the lawnmower 10, 100 may have struck or may imminently strike a living entity, the kill command previously described should be used to immediately power off the lawnmower 10, 100 and an urgent safety notification command should be issued over the cellular connection. Bright colors, continuous haptic feedback, and/or audible feedback such as sirens may be presented to all account operators via the cellular connection to the mobile phone application to convey the urgency of the situation. This may only be disabled after each operator acknowledges receipt of the notification.

If the obstacle is classified as a non-living entity, intervention is required. Many forms of intervention may be provided to the operator as described below. The choice of intervention mechanism is selected through user interface prompts within the mobile phone application and the choice is transmitted via a command to the navigation module over the cellular connection.

The operator may choose to activate the kill command previously described and defer the obstacle intervention to a later time. If the operator is away from the mower 10, 100, for example at a different property, it may be desirable to issue the kill command to power the lawnmower 10, 100 off and conserve fuel rather than immediately intervene to deal with the obstacle. Using this obstacle kill command puts the mobile application in a state where the lawnmower 10, 100 may be started and obstacle intervention may be resumed at a later time. At that future time, the mower 10, 100 may be started through the physical ignition switch or by interaction with the mobile application user interface to issue a remote start command over wireless connection. Upon detecting the engine has started, obstacle intervention may be resumed beginning with selecting the choice for the method of obstacle intervention. The use of the remote start feature here allows the operator to use the chauffeur feature described herein for the mower 10, 100 to transport the operator to the location of the obstacle.

The operator may choose for the lawnmower 10, 100 to go around the obstacle autonomously and resume normal path-following autonomous operation at the next unimpeded point along the mow path beyond the obstacle. First a command is sent to the navigation module 26 over the cellular connection to trigger this function. Processors within the navigation module 26 process image frames captured from the cameras 14 to drive around the perimeter of the obstacle at a distance that guarantees it will not collide with the obstacle using a machine-vision form of machine learning algorithm until the lawnmower 10, 100 reaches a point where autonomous travel along the planned path may continue unimpeded. The navigation module 26 monitors the coordinates captured via the GNSS system 12 to ensure the operator does not leave the boundary of the mow area while performing this function. A machine learning classification algorithm can be used to determine when the lawnmower 10, 100 has reached the nearest unimpeded segment of mow path from which normal autonomous lawnmowing may be resumed.

Upon detecting the mower 10, 100 has reached such a position where the mowing of the planned path may be resumed unimpeded, the saved current position along the mow path is advanced to this new position, and normal autonomous operation resumes automatically from this position, skipping any segment which could not be traversed due to the presence of the obstacle. If the lawnmower 10, 100 is unable to find a path around the obstacle without colliding or leaving the boundary of the mow area, a signal is sent over the cellular connection from the navigation module 26 to the mobile phone application. The operator is notified and required to choose a different option. This option for obstacle intervention may be set as the default behavior so the lawnmower 10, 100 will always attempt to continue autonomously upon encountering obstacles, notifying the operator by visual, audio, or haptic notification when obstacles are bypassed, and such situations may be dealt with later by the operator. When obstacles are automatically bypassed in this manner, the location of bypassed obstacles may be saved in computer memory and displayed on a map within the mobile phone application so the operator may easily find these areas later to intervene as needed.

The operator may choose to remove the obstacle from the mow-path, sending a signal to the navigation module 26. Upon selecting this option in the mobile application user interface, instructions are displayed on the mobile phone to the operator to remove the obstacle from the mow path, and a signal may be sent to the navigation module 26 over a wireless connection to signify that the navigation module 26 should detect when the obstacle has been cleared. While the operator moves the obstacle by any means, image frames from the cameras 14 are analyzed by the processors in the navigation module 26, detecting when the mow path is no longer obstructed using a machine learning classification algorithm. When it is determined that the path is no longer obstructed, a signal is sent over the wireless connection to the mobile phone application, and the operator is shown a user interface option within the application to resume autonomous mowing along the mow path.

The operator may choose to add the obstacle as a marked obstacle in the mow path, for example in the event of a new structure that was built on a previously recorded property, or an obstacle that was not marked during the initial recording. The user taps the record button within the mobile phone application and a signal is sent to the navigation module 26 over the cellular connection to initiate the recording process. The operator drives around the perimeter of the obstacle with the hand traction controls to capture the perimeter of the obstacle as coordinates from the GNSS system 12. When the navigation module 26 senses the user has traversed the perimeter of the obstacle by detecting the operator has completed a loop and returned to a GNSS coordinate that is sufficiently close to the starting location to constitute a complete loop, recording is stopped and the user is notified that the perimeter of the obstacle is complete, such as shown in the image of FIG. 6.

A concave hull can be captured from the recorded GNSS coordinates, and a second outer concave hull may be generated by means of outward projection from the points composing the concave hull. The fill lines from the original mow path that intersect the concave hull are changed to remove all parts of the line segment that travel within a minimum distance of the obstacle perimeter concave hull. The mow area is saved, overwriting the previously saved area that is currently being mowed with the new geometry that reflects mowing around the obstacle for future mowing.

The operator may choose to manually mow the obstacle. Upon selecting this option, the operator is prompted to dock their phone in the phone dock 16 if it is not already (for example, if the user has just completed the chauffeur function and the phone is already docked). The mobile phone application waits for detection of a battery charging state as an indication that it has been docked. Upon detecting the phone is charging, the application prompts the operator to disengage the brake and manually drive around the obstacle to mow the path around the obstacle, sending a signal from the mobile application to the navigation module 26 to initiate this function. Processors within the navigation module 26 monitor the position of the lawnmower from the GNSS system 12 and the image frames from the cameras 14 to determine when the operator has completely driven around the obstacle and is in a location where autonomous mowing may be resumed unimpeded. This can be done using a machine learning model monitoring the depth camera image frames, the position of the mower 10, 100, and the heading to determine when the lawnmower's 10, 100 position coincides to forward travel along the previous path, and where the cameras 14 no longer see an obstacle impediment along the path to resume autonomous operation. Once it has been detected that autonomous operation may be resumed, a signal is sent over wireless connection from the navigation module 26 to the mobile phone application. The operator is then shown a button or other user interface option to switch back to autonomous operation. Upon selecting this option, a signal is sent from the mobile phone application to the navigation module 26 over wireless connection, and the current position along the autonomous mow path from which autonomous mowing may be resumed is moved forward to this new point.

Many of the aforementioned choices for obstacle intervention require the operator to be present at the site of the obstacle, while the operator may be far away from the lawnmower on a different part of the property. When choosing an obstacle intervention option that requires the operator to be present at the site of the obstacle, if the operator is located within the mow area, they may be prompted with the option for the lawnmower 10, 100 to provide a chauffeur function for the operator. Upon selecting this option, the mower 10, 100 will follow a path from its current location to the location of the user using the summon feature described herein. When the lawnmower 10, 100 has arrived at the location of the operator, the brake of lawnmower 10, 100 is engaged, safety seat/platform 24 is re-enabled to ensure the operator must be on the mower 10, 100 when disengaging the brake or driving the mower 10, 100, and the operator is instructed to board the lawnmower 10, 100 and dock their phone on dock 16.

The phone application monitors for a phone docking event by detecting the presence of a charging state. Upon detecting docking of the phone, manual operation of the lawnmower 10, 100 is reenabled by the phone sending a signal to the navigation module 26 over the cellular connection. Within the mobile application, the location of the obstacle is displayed as an on-screen beacon and the operator is instructed to drive to the location of the obstacle. The operator may then use the brake and traction controls to disengage the brake and drive to the location of the obstacle that requires intervention. When the operator is close enough to the obstacle that the obstacle is within the on-screen map area of display, the obstacle is marked with a visual marker at the location of the obstacle. If the obstacle does not fit within the on-screen map area of display, it is displayed as an on-screen heading indicator that points in the direction of the obstacle. This heading indicator may be a compass indicator with a fixed on-screen location, or a beacon icon positioned at the screen edge closest to the radial direction of the obstacle, visually pointing in the direction of the obstacle. Once the operator is within a minimum distance of the obstacle, the brake is engaged by the navigation module 26, the navigation module 26 then sends a signal to the mobile phone application, and the user interface for the chosen method of obstacle intervention begins.

Upon completion of an on-site obstacle intervention, the operator may be provided the option to chauffeur to a different location prior to resumption of autonomous mowing, for example to engage in a different landscaping activity on another part of the property. Upon selecting this chauffeur function, if the operator has not already boarded the mower 10, 100 and has their phone docked within dock 16, they will be prompted to do so. The phone will detect the completion of these activities in the manner of the boarding procedure previously described. Once the operator has safely boarded the lawnmower 10, 100 and the phone is docked on dock 16, they may tap a button in the mobile phone application to enable manual drive. This sends a signal from the mobile phone application to the navigation module 26, enabling the safety seat/platform 24 and permitting manual drive by allowing the brake to be disengaged and allowing operation of the mower 10, 100 by use of the hand traction controls. The operator is instructed to drive to the remote site, and a button is presented to notify the mobile phone application when done. The navigation module may monitor GNSS coordinates and restrict the operator from driving outside the recorded mow area during chauffeur operation so that the lawnmower may return to the site of the obstacle to resume operation when finished.

If the operator has boarded the mower 10, 100, or docked the phone at the end of the obstacle intervention process, they will be instructed to remove their phone from the phone dock 16 and to dismount the mower 10, 100. The user may not be allowed to continue until the phone has been undocked from the phone dock 16 and the user has dismounted as a safety precaution. This behavior can be enforced by detecting that the phone is no longer being charged by the phone dock 16 and that the safety seat/platform 24 is not engaged. This state is communicated over the cellular internet connection and the phone will automatically proceed once it has been completed.

Once the obstacle intervention is completed, the phone is undocked from the phone dock 16, and the user has dismounted, the user is presented with a screen through the mobile phone application to resume the autonomous mowing process. To avoid accidental engaging of autonomous mowing, a user interface action must be used that may not be triggered accidentally. In one embodiment, a start button through the mobile phone application must be held for 5 seconds with a countdown and haptic feedback. When this action is completed, a command is sent over the cellular connection and the mower 10, 100 can then resume autonomous driving from the previously saved point of progress as previously described. If the operator chauffeured to another location on the property at the end of the obstacle intervention, the jump-path algorithm previously described is used to generate a path from the lawnmower's 10, 100 current location from the end of the chauffeur function to the saved point at which autonomous operation is to be resumed after the obstacle intervention.

The cameras 14 can be trained to watch for people making a kill switch hand signal, such as arms crossed in the shape of an X, by use of machine vision classification. Upon detecting such a kill switch hand signal, the navigation module 26 will trigger the kill command as described above.

If the mower 10, 100 ends its mow path assignment before completing traversal of all assigned geometric artifacts, either by a kill command or a maintenance event as previously described, the internet servers receive a signal denoting the event. The internet servers may send a notification signal to all mobile phones linked to the account via push notification, or other signal. If no other mowers 10, 100 are mowing within the mow area that was stopped prematurely, the user will be prompted whether to save the current state of progress. If this save option is selected, the stopped lawnmower 10, 100 will be sent a command through the wireless connection, triggering it to send and save the list of all untraversed mow path artifacts, including the remainder of the segment currently under traversal, to the internet servers.

If the mower 10, 100 ends its mow path assignment before completing traversal of all assigned geometric artifacts, and other mowers 10, 100 are in operation within the same mow area, the mobile phone application user can instead be prompted whether to reassign the untraversed mow path artifacts to other mowers 10, 100 in operation. If this operation is selected, the stopped mower 10, 100 is sent a signal, triggering it to send the details of its untraversed geometric segments to the internet server and an algorithm is employed to reassign these segments to other mowers 10, 100 in operation. In some embodiments, the algorithm may assign all untraversed segments to the single mower 10, 100 closest to completion, or alternatively pause operation of all mowers 10, 100 and recalculate the list of geometric artifact assignments to distribute this new assignment more equally.

When the mower 10, 100 has completed mowing of the assigned mow path, the navigation module 26 sends a command to the internet servers over the cellular communication channel. This signal may be sent to mobile phones monitoring the account by means of push notification or other signal, triggering a notification on all mobile phones. The lawnmower 10, 100 is powered off to conserve fuel by means of the kill command previously described.

The IMU processor within the navigation module 26 may be used to monitor the amplitude and frequency of engine vibration to detect an engine stall event. In the event of an engine stall, the brake may be automatically engaged, blades disengaged, and the navigation module 26 should transmit a command through the cellular connection, which may be sent to mobile phone operators by means of mobile push notification or other means of wireless signaling.

In some cases, a stall event may be triggered by tall grass and some user interface options may be provided to help with this concern. A retry user interface option may be displayed to send a command to the mower over the cellular connection. This command will cause the mower 10, 100 to be remotely started using the remote start feature previously described, followed by the mower 10, 100 moving in reverse to a previous point in the mow path, re-engaging the blades, and attempting to resume autonomous mowing from this point. In another embodiment, the mower 10, 100 may be equipped with the ability to remotely adjust the mowing deck height through an electrical connection before the retry function to reduce the risk of a repeated stall.

In the case of a stall event due to tall grass it may be desirable for the operator to manually mow the problem area. The previously described chauffeur function may be used to start the mower 10, 100 with the blades disabled and take the operator to the site of the stall event, in the same manner as when taking the operator to the site of an obstacle. The operator may then continue mowing with manual operation from that point.

Maintenance concern events may be detected by the mower 10, 100 in various forms during operation. A machine learning model used for navigation may monitor the error of its predictions against the actual travel of the lawnmower 10, 100 or expected behavior of its reward function (in the case of an actor-critic model). This error may be compared to a threshold or tolerance to detect a wide variety of maintenance concerns including poor calibration, steering pull, or low power (for example, due to a poorly running engine). Other methods may be used for monitoring for maintenance events, including monitoring key performance indicators of operation such as throttle response, steering pull, and acceleration. Upon detection of any form of maintenance concern event, the navigation module 26 should transmit a wireless command to the internet servers, which may be sent to mobile phone operators by means of mobile push notification or other means of wireless signaling. Some concerns, such as minor steering pull, may be automatically compensated for by a machine learning model for mow path navigation. This is achieved by providing inputs to the trained machine learning model that measure the effect so that the model may compensate. In this case, the mobile phone users monitoring the operation may be notified of the maintenance event without requiring the mower 10, 100 to cease operation. In other cases where the event is more severe and exceeds a larger threshold, the mower operation may be entirely stopped via a kill command as previously described.

After the mower 10, 100 has completed mowing the selected mow path, or if a kill command is issued, the mower engine is powered off, but the navigation module 26 continues to consume power and drain the battery. The navigation module 26 remains operational to allow it to receive commands such as summon or resume, or to allow for a manual drive operation. Battery depletion is not a concern when the engine is on and the alternator of mower 10, 100 is charging the battery, but it is a concern when the engine and alternator are not running, and the battery may be depleted. To prevent excessive drain of the battery when the engine is not running, the battery voltage level is measured by an electrical connection to the navigation module 26. The navigation module 26 monitors the battery level over this connection and uses this measured battery level with a software inactivity timer to disable the power supply for the navigation module 26 and to prevent excessive battery depletion. This will also disable the ability to receive cellular signals or monitor the operation of mower 10, 100. Normal operation may be resumed by power cycling the navigation module 26 by turning on the mower 10, 100 utilizing the on/off switch or ignition keyhole 15.

One or more embodiments of the system autonomous mower system can include an anti-turf setting to avoid damaging the turf in wet conditions. This setting changes a parameter in the navigation algorithm that discourages mower 10, 100 from turning too sharply or decelerating too quickly. A higher anti-turf setting will result in the use of 3-point-turns when a continuous turn cannot be achieved with a wider turn radius. This will occur when jumping between adjacent fill lines that necessitate a 180-degree turn.

One or more embodiments of the system autonomous mower system include the ability to use a last-mow' mode. The use of the anti-turf setting described above can result in the navigation algorithm requiring 3-point-turns between every fill line traversal to avoid damaging the turf. An alternative 'fast mow' mode may be enabled in the settings through the mobile phone application to avoid the use of 3-point-turns, mowing the lawn in a shorter amount of time. In this mode, after completing each fill line segment, two fill lines are skipped before reversing direction and traversing the following fill line. By skipping two fill lines, the turn radius is much wider. This allows the mower to avoid the use of 3-point-turns without damaging the turf, allowing for faster continuous turns. When the mower reaches the final fill line segment, it must complete a single 3-point-turn to reverse direction. It then will traverse one of the two skipped fill lines between each traversed segment from the prior pass. Finally, upon reaching the first traversed segment a second 3-point-turn will be performed. The mower 10, 100 will then traverse one last time, completing the second skipped fill line between the traversed segments.

Operators may choose to listen to music or other media in the course of work. An integrated media playback control feature allows the user to see the name of the media currently playing, change the song, pause, or have other basic interactions with their media during operation without requiring extra taps or screen interactions to change applications. This function should be displayed as an overlay on the edge of the map on the manual drive and monitoring screens. During the hands-free screen-on mode enabled by the phone charging dock 16 described above, this allows the operator to interact with media playback (for example, to skip a song) with a single tap, without needing to operate menus, swipe or change application. This design minimizes the time the hand needs to be removed from the hand traction controls to perform this function.

When multiple lawnmowers 10, 100 are being used simultaneously, the mobile phone application may display the location and progress of other mower 10, 100 in operation as a small map overlay within recording and monitoring screens. Showing this progress indicator on the main map screen allows for easy viewing of the progress of other mowers 10, 100 in operation. This is particularly valuable in manual operation where the hand traction controls require the use of both hands and showing the progress of other mowers 10, 100 as an overlay allows for hands-free viewing for the progress of other mowers 10, 100. Progress may be displayed as a calculation from the number of mow artifacts traversed, the percentage of the mow area traversed, or an estimated of time remaining until the mower 10, 100 has completed its autonomous operation. A visual indicator such as an avatar icon, short numerical or text identifier, or color may be chosen within the mobile phone application to identify individual lawnmowers 10, 100 when a lawnmower 10, 100 is first linked to the account. Physical labels or decals may be provided with the product to label individual lawnmowers 10, 100 to match their visual artifact. Tapping a progress icon of a lawnmower 10, 100 may trigger the primary map interface of the mobile phone to monitor the status of the mower 10, 100 selected by that icon. The user interface option to change the map screen to monitor a different mower 10, 100 may be restricted while the operator is connected to a specific mower 10, 100 in manual drive mode, obstacle intervention mode, or other operations that require the operator's full attention.

Due to the limits of mobile phone screen real-estate, only a limited number of mowers 10, 100 may be presented as screen overlays. A method of prioritization may be employed to determine screen placement of each mower 10, 100, as well as which mowers 10, 100 are shown if all may not be shown due to limits of screen real-estate. Mowers 10, 100 may be prioritized by various methods including estimated time to completion, percentage of progress, or distance relative to the operator's mobile phone's GNSS receiver coordinate. A setting within the mobile phone application user interface may allow the user to control the method of prioritization.

A mower list screen may show a summary of the progress of all operating mowers 10, 100 by means of showing a list of all operating mowers 10, 100 in either a list or grid display. A touch-based scrolling interaction may allow for the display of an unlimited number of lawnmowers 10, 100. Upon tapping an individual mower 10, 100, that mower may be shown as the primary mower 10, 100 in the map interface.

While aspects of the invention are disclosed herein relative to use with lawns and grass, the system, mower, and method disclosed herein may also be utilized in other locations, such as fields and meadows, and with other materials, such as crops (e.g., hay).

In light of the foregoing, it should be appreciated that the present invention advances the art by providing an improved autonomous mower system. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. An autonomous lawnmower system comprising
a lawnmower capable of being operated in a non-autonomous mode and an autonomous mode;
a global navigation satellite system (GNSS) coupled with the lawnmower;
a plurality of cameras coupled with the lawnmower;
a mobile phone dock coupled with the lawnmower;
a drive-by-wire traction control system for controlling the lawnmower;
a navigation module coupled with the lawnmower; and
a mobile phone, the mobile phone controlling and monitoring the lawnmower when in the autonomous mode.

2. The autonomous lawnmower system of claim 1, the plurality of cameras being secured to a body of the lawnmower, the plurality of cameras being spaced about the body in order to provide full vision coverage of an entire field of view of the lawnmower.

3. The autonomous lawnmower system of claim 2, the plurality of cameras including from 2 or more to 6 or less cameras.

4. The autonomous lawnmower system of claim 1, the global navigation satellite system (GNSS) being secured to a body of the lawnmower, the mobile phone dock being secured to the body of the lawnmower, and the navigation module being secured to the body of the lawnmower.

5. The autonomous lawnmower system of claim 1, the drive-by-wire traction control system being secured to a left side of the lawnmower, and a second drive-by-wire traction control system being secured to a right side of the lawnmower.

6. The autonomous lawnmower system of claim 1, the mobile phone dock being secured to a side of a body of the lawnmower, the mobile phone dock being positioned directly above a parking brake of the lawnmower.

7. The autonomous lawnmower system of claim 1, the mobile phone dock including an integrated phone charger, where the integrated phone charger is an inductive charger.

8. The autonomous lawnmower system of claim 7, the mobile phone including a mobile phone application, where when the mobile phone is in a charging state via the inductive integrated phone charger, detection of the charging state of the mobile phone triggers a step for the mobile phone application.

9. The autonomous lawnmower system of claim 8, where the mobile phone is in the charging state, thereby triggering the step for the mobile phone application, where the step for the mobile phone application includes one or more of enabling a screen of the mobile phone to be in an always-on mode, prompting an operator to manually drive around an obstacle, and directing the operator to a location of the obstacle.

10. A kit for retrofitting a lawnmower to be autonomously operated, the kit comprising
a navigation module mountable to the lawnmower;
an electrically actuated parking brake mountable to the lawnmower and connectable to the navigation module;
a switch for actuating the electrically actuated parking brake, the switch being connectable to the navigation module;
a first drive-by-wire traction control system and a second drive-by-wire traction control system, the first drive-by-wire traction control system and the second drive-by-wire traction control system being connectable to the navigation module;
a plurality of cameras, each camera of the plurality of cameras being connectable to the navigation module;
a global navigation satellite system (GNSS) connectable to the navigation module;
a mobile phone dock mountable to the lawnmower and connectable to the navigation module; and
cables and connectors for integrating the navigation module into the lawnmower.

11. The autonomous lawnmower system of claim 10, the mobile phone dock including an integrated phone charger, where the integrated phone charger is an inductive charger.

12. The autonomous lawnmower system of claim 11, the mobile phone dock receiving a mobile phone having a mobile phone application, where when the mobile phone is in a charging state via the inductive integrated phone charger, detection of the charging state of the mobile phone triggers a step for the mobile phone application.

13. The autonomous lawnmower system of claim 12, where the mobile phone is in the charging state, thereby triggering the step for the mobile phone application, where the step for the mobile phone application includes one or more of enabling a screen of the mobile phone to be in an always-on mode, prompting an operator to manually drive around an obstacle, and directing the operator to a location of the obstacle.

14. A method of autonomously operating a lawnmower, the method comprising steps of mounting a safety seat or standing platform of the lawnmower;
docking a mobile phone within a mobile phone dock secured to the lawnmower;
accessing a mobile phone application downloaded to the mobile phone;
defining a mow area by non-autonomously driving the lawnmower around a perimeter of the mow area while a global navigation satellite system (GNSS) secured to the lawnmower is capturing GNSS coordinates of the perimeter;
sending the GNSS coordinates to a computer processor within the lawnmower;
sending the GNSS coordinates to computer servers connected with the computer processor via the internet;
saving the GNSS coordinates on the computer servers;
sending the GNSS coordinates to the mobile phone;

undocking the mobile phone having the GNSS coordinates from the mobile phone dock;
unmounting the safety seat or standing platform; and
instructing autonomous mowing of the mow area via the mobile phone application, with the proviso that an operator and the mobile phone having the GNSS coordinates are present within the mow area during the step of instructing autonomous mowing, with the proviso that the operator is not on the lawnmower during the autonomous mowing.

15. The method of claim 14, where the mobile phone is part of a plurality of mobile phones, the method further comprising a step of synchronizing mow areas and navigation plans between the plurality of mobile phones, where the mow areas and the navigation plans are derived from the GNSS coordinates.

16. The method of claim 14, where the computer processor is within the global navigation satellite system.

17. The method of claim 14, where the step of docking the mobile phone within the mobile phone dock further includes charging the mobile phone, where the charging of the mobile phone triggers a step for the mobile phone application.

18. The autonomous lawnmower system of claim 17, where the step for the mobile phone application includes one or more of enabling a screen of the mobile phone to be in an always-on mode, prompting an operator to manually drive around an obstacle, and directing the operator to a location of the obstacle.

\* \* \* \* \*